G. M. EATON.
ROTATABLE MEMBER FOR DYNAMO ELECTRIC MACHINES.
APPLICATION FILED JULY 12, 1917.
1,351,898.
Patented Sept. 7, 1920.
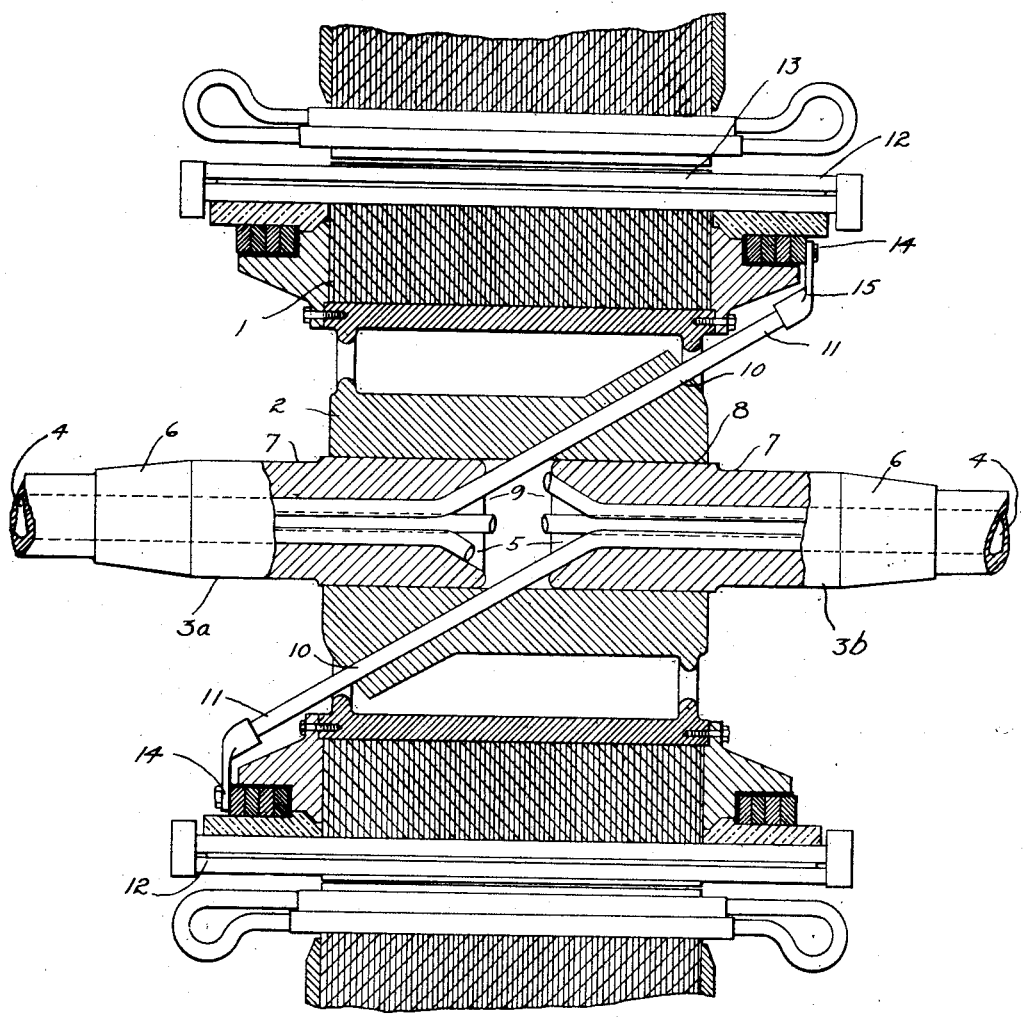

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

ROTATABLE MEMBER FOR DYNAMO-ELECTRIC MACHINES.

1,351,898. Specification of Letters Patent. Patented Sept. 7, 1920.

Application filed July 12, 1917. Serial No. 180,078.

*To all whom it may concern:*

Be it known that I, GEORGE M. EATON, a citizen of the United States, and a resident of Pittsburgh, in the county of Allegheny and State of Pennsylvania, have invented a new and useful Improvement in Rotatable Members for Dynamo-Electric Machines, of which the following is a specification.

My invention relates to rotatable members for dynamo-electric machines, and it has for its object to provide a novel arrangement of parts whereby current-collecting leads may be readily disposed within the shaft of the rotatable member and conveniently connected to the windings that are carried thereby.

A further object of my invention is to provide a rotatable member of the above-described type in which a highly tempered shaft may be used, my novel arrangement of parts being such as to eliminate the necessity of machining the shaft after it has been tempered.

It has heretofore been proposed to locate collector leads within the shaft of a rotatable member but considerable difficulty has been encountered in bringing the leads out of the shaft without subjecting them to objectionable bending. Furthermore, in the previous arrangements, it has been necessary to drill holes in the shaft at angles to the longitudinal axis thereof, thereby weakening the shaft and preventing the use of highly tempered metal.

By my invention, I provide an arrangement in which the collector leads are bent but very slightly and in which provision is made for bringing the leads out of the shaft without the necessity of drilling any holes therein other than that which extends longitudinally through its center.

The single figure of the accompanying drawing is a longitudinal sectional view of a rotatable member of a dynamo-electric machine embodying my invention.

A magnetizable core member 1 is mounted on a spider 2 that is carried by a divided shaft which comprises two substantially duplicate portions $3^a$ and $3^b$. Each shaft portion is provided with a centrally located, longitudinally extending bore 4 having a flaring end portion 5. Each shaft portion is further provided with a gear seat 6 and an enlarged portion 7 that is adapted to make a press fit within the bore 8 of the spider 2. The end portions 5 are thus in complementary relation and constitute the ends of a substantially centrally located recess 9 within the rotatable member. The spider 2 is provided with passages 10 that extend substantially parallel to the walls of the end portions 5 and terminate at points adjacent to the respective ends of the core member 1. A plurality of collector leads 11 extend from the outer ends of the shaft portions $3^a$ and $3^b$ through the bores 4 and the passages 10. The leads 11 project beyond the respective ends of the spider 2 to points adjacent to the over-hanging end portions 12 of a winding 13 that is carried by the core member 1 and are connected to the cross connectors 14 of the winding 13 by suitable terminal members 15.

From the foregoing, it is apparent that the collector leads 11 may readily be applied to the rotatable member with but little bending or distortion because of the angular relation of the passages through which they may be pulled from one end of the machine to the other.

Furthermore, the surface of the shaft may be tempered exceedingly hard before the respective portions thereof are applied to the core member, as it is not necessary to drill openings therein at angles to its longitudinal axis. This is particularly advantageous in a railway motor in connection with which it is customary to mount a gear member upon the seat 6, it being thus made possible to remove such member without marring the surface of the shaft. The advantage of having the leads enter the machine through both ends of the shaft is that leads to be connected to the winding on one side of the machine are brought into the machine through the shaft on the other side of the machine, causing the angle between the portion of lead in the shaft and the portion connected to the winding to always be greater than 90°, thus eliminating the necessity of any sharp angles in the leads.

While I have shown my invention in a simple and preferred form, it is not so limited but is susceptible of various minor changes and modifications within the scope of the appended claims.

I claim as my invention:

1. A rotatable member for dynamo-electric machines comprising a magnetizable core and a divided shaft, one of the parts of which is provided with a longitudinally extending passage having a flaring end portion to provide a recess within said member, and a lead disposed within said passage and leaving said passage at said recess and extending to the opposite side of said core.

2. A rotatable member for dynamo-electric machines comprising a magnetizable core and a hollow shaft consisting of two spaced parts, the adjacent end portions of which are flared to provide a recess within said member, and leads disposed within both parts of said hollow shaft and leaving said shaft at said recess and extending to the ends of the winding on said magnetizable core which are opposite to the ends of the machine through which the respective leads enter.

In testimony whereof I have hereunto subscribed my name this 29th day of June, 1917.

GEORGE M. EATON.